(12) United States Patent
Charif et al.

(10) Patent No.: US 9,324,038 B2
(45) Date of Patent: Apr. 26, 2016

(54) METHOD AND SYSTEM FOR CLUSTERING, MODELING, AND VISUALIZING PROCESS MODELS FROM NOISY LOGS

(71) Applicant: Xerox Corporation, Norwalk, CT (US)

(72) Inventors: Yasmine Charif, Rochester, NY (US); Julien Jean Lucien Bourdaillet, Rochester, NY (US); David Russell Vandervort, Walworth, NY (US); Michael P. Kehoe, Rochester, NY (US); Saurabh Kataria, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 327 days.

(21) Appl. No.: 14/081,203

(22) Filed: Nov. 15, 2013

(65) Prior Publication Data

US 2015/0142707 A1    May 21, 2015

(51) Int. Cl.
G06N 99/00 (2010.01)
(52) U.S. Cl.
CPC .................... *G06N 99/005* (2013.01)
(58) Field of Classification Search
CPC .................................................. G06N 99/005
USPC ........................................................... 706/12
See application file for complete search history.

(56) References Cited

U.S. PATENT DOCUMENTS

| 2006/0167923 | A1 | 7/2006 | Casati et al. |
| 2008/0249822 | A1 | 10/2008 | Hochberg et al. |
| 2011/0267351 | A1 | 11/2011 | Curbera et al. |

OTHER PUBLICATIONS

Teng et al ("Voice Activity Detection Using Convolutive Non-Negative Sparse Coding" IEEE 2013).*
Baralis et al ("Multi-document summarization based on the Yago ontology" online Jun. 28, 2013).*
Van Der Aalst, W.M.P, "Process Mining: Discovery, Conformance, and Enhancement of Business Processes", Springer-Verlag Berlin Heidelberg, 2011.
http://www.splunk.com/, 2012.
Van Der Aalst, W.M.P., H.A. Reijers, A.J.M.M. Weijters, B.F. van Dongen, A.K. Alves de Medeiros, M. Song, and H.M.W. Verbeek, *Business Process Mining: An Industrial Application*, Information Systems, 32(5):713-732, 2007.
Lee, Daniel D. and H. Sebastian Seung, "*Algorithms for Non-negative Matrix Factorization*", Advances in Neural Information Processing Systems 13: In Proc of the 2000 Conference. MIT Press. pp. 556-562, 2001.
Van Der Aalst, V.M.P., A.J.M.M. Weijters, and L. Maruster, *Workflow Mining: Discovering Process Models from Event Logs*, IEEE Transactions on Knowledge and Data Engineering, 16(9):1128-1142, 2004.
Medeiros, A.K.A., A.J.M.M. Weijters, and W.M.P. van der Aalst, *Generic Process Mining: An Experimental Evaluation*, Data Mining and Knowledge Discovery, vol. 14(2):245-304, 2007.
Alpaydin, E., *Introduction to Machine Learning*, MIT Press, 2010.
Medeiros, A.K.A., W.M.P. van der Aalst, and A.J.M.M. Weijters, *Workflow Mining: Current Status and Future Directions*, LNCS vol. 2888, pp. 389-406, Springer, 2003.
http://www.omg.org/spec/BPMN/2.0.

* cited by examiner

*Primary Examiner* — Lut Wong
(74) *Attorney, Agent, or Firm* — Fay Sharpe LLP

(57) ABSTRACT

A process discovery system that includes an offline system training module configured to cluster similar process log traces using Non-negative Matrix Factorization (NMF) with each cluster representing a process model, and learn a Conditional Random Field (CRF) model for each process model and an online system usage module configured to decode new incoming log traces and construct a process graph in which transitions are shown or hidden according to a tuning parameter.

23 Claims, 10 Drawing Sheets

METHOD AND SYSTEM FOR CLUSTERING, MODELING, AND VISUALIZING PROCESS MODELS FROM NOISY LOGS

BACKGROUND

The exemplary embodiment relates to a process discovery method and system for clustering, modeling, and visualizing process models from noisy logs using non-negative factorization and classification of activity sequences.

By way of background, business process discovery is the next level of understanding in the emerging field of business analytics, which allows organizations to view, analyze and adjust the underlying structure and processes that go into day-to-day operations. The challenges of a discovery procedure include gathering information of all of the components of a business process (technology, people, department procedures, and protocols), capturing concurrency, dealing with noise and incompleteness, and constructing a representation of the observed business processes and their variations. The information gathered enable viewing the causal and dynamic dependencies in processes and organizations, checking the conformance of the discovered processes with the models the organization specified (i.e. detecting good or bad deviations), fixing defects or enhancing process operations.

There are several families of approaches to do the actual discovery, many of which overlap in terms of the techniques used, such as direct algorithmic approaches (the $\alpha$-algorithm), two-phase approaches (e.g., using hidden Markov Models), computational intelligence approaches (e.g., genetic process mining), etc. Such approaches may work well in specific contexts, but they have drawbacks, such as not dealing with noise and 1 and 2 node cycles, assuming one unique process to discover, producing "lossy" process mappings (that need to be adapted to fit the target language) and being rather slow.

Therefore, there is a need for a robust process discovery method that handles multiple processes in an organization, deals with noise in the process logs, and translates visually its findings. This suggests the need to combine a clustering method and probabilistic representations.

BRIEF DESCRIPTION

The exemplary embodiment relates to a method and system for analyzing noisy process logs and producing sound process model representations. In the context of process discovery, the provenance of a process log is unknown (i.e., the organization process models are not provided a-priori). Also, the noise in the logs may be found in: (a) exceptional/rare activity log entries, (b) interleaving process executions, and/or (c) incompleteness of logs (i.e., not all data has been gathered).

The exemplary process discovery method includes at least: (1) an offline training portion in which: (i) similar log traces are clustered using a process such as Non-negative Matrix Factorization (NMF), each cluster representing a process model, and (ii) a Conditional Random Field (CRF) model is learned for each process model; and (2) an online usage portion in which: (i) new incoming log traces are decoded, i.e., the process model that generated them is identified out of the learned CRFs, and (ii) a tunable process graph is constructed where transitions are shown or hidden according to a tuning parameter.

In one embodiment, a computer-implemented process discovery method is provided. The method includes receiving as input at least one noisy log file that contains a plurality of labeled log traces from a plurality of process models; clustering similar log traces using non-negative matrix factorization (NMF) into a plurality of clusters, wherein each cluster represents a different process model; learning a Conditional Random Field (CRF) model for the process models; decoding new incoming log traces; and constructing a process graph, wherein one or more transitions are shown or hidden according to a tuning parameter.

In yet another embodiment, a process discovery system is provided. The system includes at least an offline system training module configured to receive as input at least one noisy log file that contains a plurality of labeled log traces from a plurality of process models, cluster similar log traces using Non-negative Matrix Factorization (NMF) with each cluster representing a different process model, and learn a Conditional Random Field (CRF) model for each process model; and an online system usage module configured to decode new incoming log traces and to construct a tunable process graph in which transitions are shown or hidden according to a tuning parameter.

Optionally, and in accordance with any of the preceding embodiments, clustering similar log traces may further comprise decomposing a term-document matrix into at least a term-cluster matrix and a cluster-document matrix; the CRF may learn to classify a sequence of activities that comprise a process model by associating an activity entry in a log trace to an activity label at least according to one or more features and a previous activity; learning a CRF model for each of the process models may further comprise associating a TF-IDF vector for at least one cluster and for the entries in a log trace by assigning a label to each activity log entry according to a reference annotation, wherein one or more features of the vector comprise one or more words occurring in the entry, and for each feature computing a TF-IDF score by taking into account substantially all the activity log entries in the cluster only, and adding a Boolean feature such as the name of the previous activity, generating one or more feature matrices, and training a CRF for each feature matrix; a visualization of discovered process models may be provided by transforming a probabilistic activity transition matrix into a footprint matrix directly usable by a $\alpha$+-algorithm; the tunable process graph may comprise a visual representation of discovered process models associated with the learned CRFs and includes at least a plurality of nodes representing activities, a plurality of arrows representing transitions, one or more "OR" or "AND" gateways, and an output; decoding new incoming log traces may further comprise submitting the incoming log traces into the learned CRFs to obtain a matching probability and a decoding of the incoming log traces, wherein the incoming log traces include activity log entries, the CRFs classifying a sequence of feature vectors that correspond to a sequence of activities in the incoming traces, the CRFs labeling each activity log entry with an activity name and assigning a particular likelihood score to each of the sequences of activities according to the learned models, ranking likelihood scores calculated by each CRF, generating as output the process model that generated the trace and the activity names corresponding to each activity entry in the trace; and/or the tunable process graph may be tuned using a [0,1] parameter that controls the level of transition rates, wherein when the parameter is close to 1, highly probable transitions are shown to the user and when the parameter is close to 0, transitions with low probabilities are visible.

In yet another embodiment, a computer-implemented process discovery method is provided. The method includes receiving as input at least one noisy log file that contains a plurality of labeled trace activity log entries from a plurality of process models, wherein each trace in the log comprises a document; calculating a term frequency-inverse document frequency (TF-IDF) vector score for each document in the log file, wherein words appearing in the document comprise the features of a vector for which the TF-IDF vector score is calculated; obtaining a term-document matrix, wherein each cell contains the TF-IDF score of a given term in a given document; applying non-negative matrix factorization (NMF) to cluster similar documents; obtaining a plurality of clusters of noisy process documents via NMF, wherein each cluster contains the documents of different instances of the same process model. For each cluster and for each activity log entry in a document, a process of associating a TF-IDF vector is performed as follows: a label for each activity log entry is assigned according to a reference annotation; the features of the vector are words occurring in the entry; for each feature, a TF-IDF score is computed by taking into account all the entries in this cluster only; and a Boolean feature comprising the name of the previous activity is added. The method further includes computing feature matrices, wherein the feature matrices comprise term-document matrices in which each document is a trace activity entry and is augmented with at least one Boolean feature that represents the previous activity; training a conditional random field (CRF); obtaining as output a plurality of CRFs, wherein each CRF is configured to model one or more transition probabilities between activities of one process model; storing a plurality of inverse document frequency (IDF) vectors of terms, wherein each vector is the size of a feature vocabulary for a given cluster.

DETAILED DESCRIPTION

Figure 1:
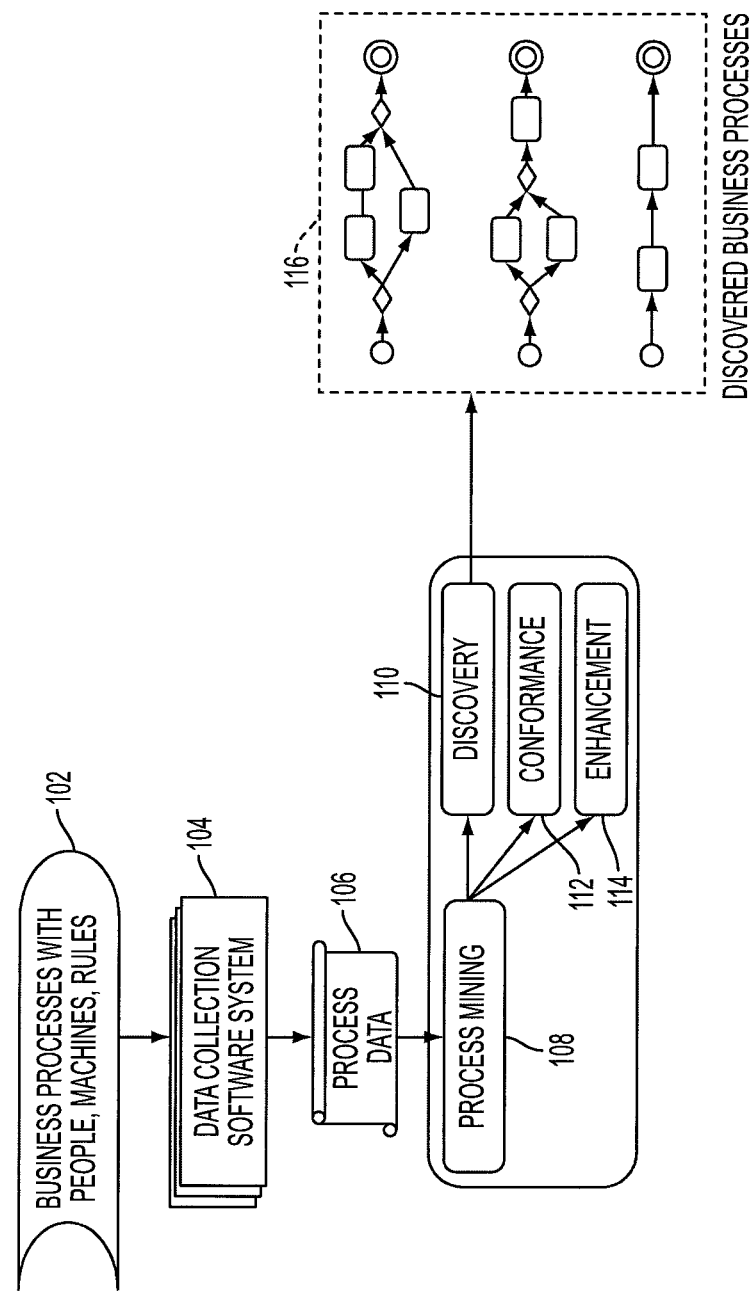
FIG. 1 is a schematic illustration showing three process mining families.

The exemplary embodiment relates to a discovery method that builds process models out of noisy event logs and produces sound process models that can be visualized via tunable process graphs that maintain the information on transition probabilities. Some of these terms used herein are defined below:

A "process model" is a representation of the control flow of a set of activities/services. It can be formalized in languages such as BPMN 2.0, Petri Nets, Causal Nets, etc.

A "process instance" is one possible execution of a process model, through the reception of a triggering event, and the instantiation of the process model activities.

A "trace" is a collection of activity log entries that have been generated by the same process instance.

A "log" is a collection of traces.

"Noise" may be found in: (a) the occurrence of log entries of exceptional/rare activities in a trace, (b) interleaving process instance traces, and/or (c) incomplete traces.

TF-IDF or "Term Frequency-Inverse Document Frequency" is a common score used in information retrieval.

CRF or "Conditional Random Field" is a probabilistic classifier that classifies sequences of items by taking into account the features of each item in addition to the labels of the previous items.

NMF or "Non-negative Matrix Factorization" is a clustering method that takes in input a co-occurrence matrix, i.e., in the case of information retrieval, a term-document matrix, and produces clusters of related documents.

Information systems record huge amounts of data and events (e.g., gigabytes of tabular data, terabytes of document data, and petabytes of unstructured, streaming, dynamic format data. Monitoring business activities is essential to providing real time information about the status and results of various operations, processes, and transactions. For example, the 2003 North America blackout was apparently triggered when a local outage was not detected by monitoring software, and Information Week says IT downtime costs $26.5 billion in lost revenue. Therefore, some of the benefits of business activity monitoring include enabling an enterprise to make better informed business decisions, quickly address problem areas, and re-position organizations to take full advantage of emerging opportunities.

Emerging concepts such as BAM (business activity monitoring), BOM (business operations management), and BPI (business process intelligence) convey the need for monitoring systems to focus on causal and dynamic dependencies in processes and organizations, and not just on simple performance indicators (e.g., flow time, utilization). Business process mining, or "process mining" for short, aims at the automatic construction of models explaining the actual behavior of activities and processes observed from the system logs.

Classical business process management systems (BPMS), e.g., SmartBPM by PegaSystems, enterprise resource planning (ERP), e.g., SAP Business suite, customer relationship management (CRM), e.g., SalesForce, middleware, e.g., IBM's Websphere, and hospital systems, Siemens Soarian, may provide detailed information about the activities that have been executed.

As shown in FIG. 1, a business may involve various business processes 102 with people, machines, rules, etc. At least one data collection software system 104 collects data from the business processes, which is recorded in the form of logs 106 that are scattered over many tables and files. An extraction effort is needed before conducting any process mining and/or analysis. Various types of process mining 108 can be performed on the logs 106, various modules including a discovery module 110, a conformance module 112, and an enhancement module 114.

The discovery module 110 takes logs and produces a model without using any a-priori information. It is used to rebuild processes that are taking place without relying on any catalog of process models.

The conformance module 112 may compare an existing process model in a business process catalog with a trace of the same process. It is used to check if reality, as recorded in the log, and discovered via process discovery techniques, conforms to the model, and vice versa, e.g., checking if two IDs have been provided every time an amount superior to $5,000 have been checked. It is used to detect, locate, explain deviations, and to measure the severity of these deviations. The result is a set of discovered businesses processes 116, such as a claims processing business process, an insurance case initiation business process, a travel approval business process, etc.

The enhancement module 114 extends or improves an existing process model using information about the actual process recorded in some log. Whereas conformance checking measures the alignment between model and reality, enhancement aims at changing or extending the a-priori model, e.g., changing the sequential execution of two activities in a model into parallel.

When processes are executed, their traces are recorded into log files. These logs can be produced either by the activities/services orchestrated by the process, or by the orchestration engine (not shown). Each activity may produce several log lines, which are referred to as activity log entries, and may execute in parallel with other activities. It is also assumed that the logs contain entries that signal the beginning and the end of each process execution, e.g., these entries may be produced by the engine or the first service in a process. This does not mean that there is no noise in the logs, as there still can be interleaving external activities, rare activities and/or incomplete traces.

Figure 2:
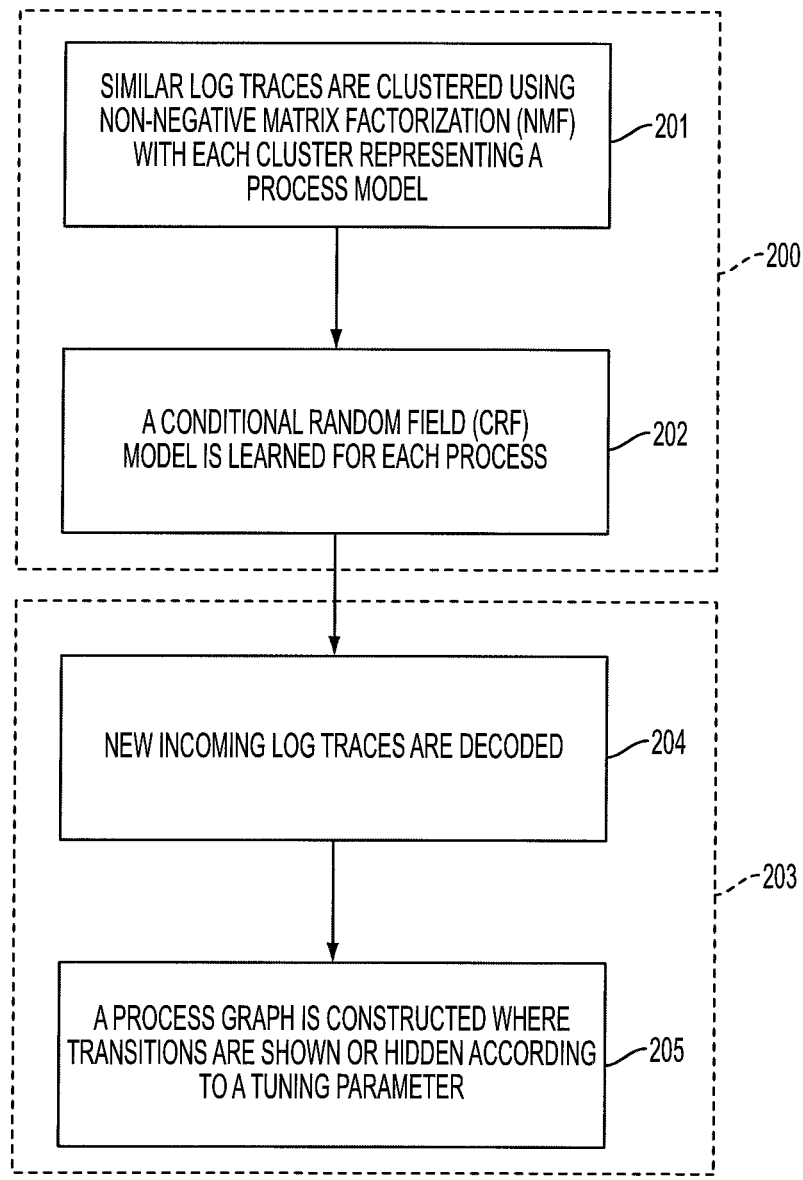
FIG. 2 is a flowchart of an exemplary process discovery method.

With reference to FIG. 2, the exemplary discovery method includes, but is not necessarily limited to: an offline system training step (200) in which similar log traces are clustered using a process such as Non-negative Matrix Factorization (NMF) with each cluster representing a process model (201), and a Conditional Random Field (CRF) model is learned for each process model (202); and an online usage step (203) in which new incoming log traces are decoded (204), i.e., the process model that generated them is identified out of the learned CRFs, and a tunable process graph is constructed where transitions are shown or hidden according to a tuning parameter (205).

Figure 3:
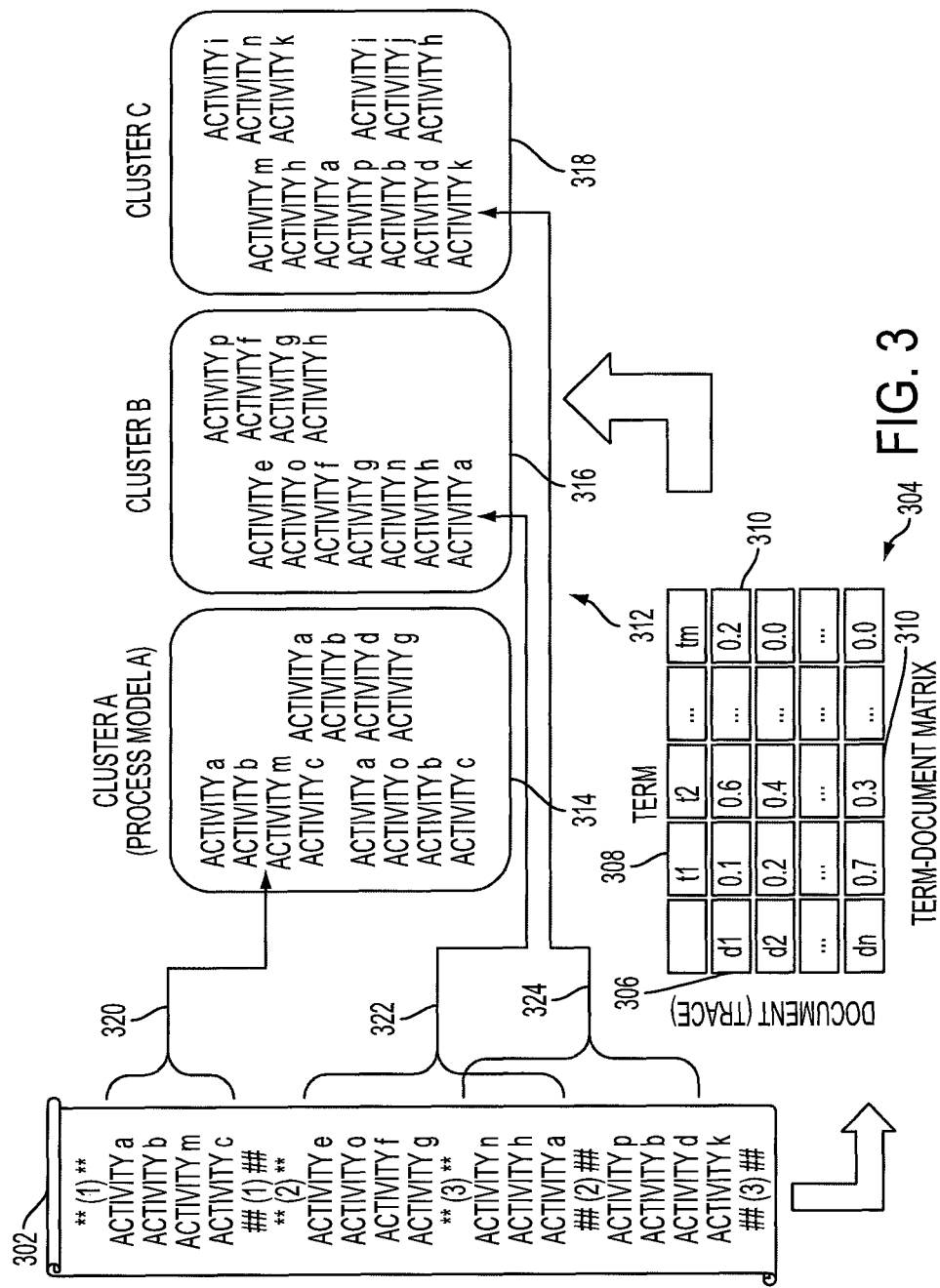
FIG. 3 is a schematic illustration of offline training.

The offline system training step 200 will now be described in greater detail. As illustrated in FIG. 3, which is a schematic illustration of offline training, the input 302 generally includes noisy logs of multiple executed business process instances where activity log entries are not yet labeled.

Each trace in the logs is considered as a document (the traces may be considered as a collection of documents). For each trace/document, its activity log entries may be labeled by an expert (e.g. a system engineer), and its TF-IDF vector score is calculated. The words appearing in the trace constitute the features of the vector for which the TF-IDF score are calculated. As a result, a term-document matrix 304 is obtained, i.e., with documents (e.g., d1, d2, . . . dn) in rows 306 and terms (e.g., t1, t2, . . . tm) in columns 308, where each cell 310 contains the TF-IDF score of a given term in a given document.

A process such as NMF is then applied so as to cluster similar traces (or documents). It should be noted that NMF performs the clustering by decomposing a term-document matrix into at least two matrices, such as (1) a term-cluster matrix and (2) a cluster-document matrix.

The output 312 includes K clusters 314, 316, 318 (or Cluster A, Cluster B, Cluster C) of noisy process traces, which are obtained via NMF. Each cluster contains the traces 320, 322, 324 of different instances of the corresponding process model, i.e., Cluster A is related to Process Model A, and so on.

Figure 4:
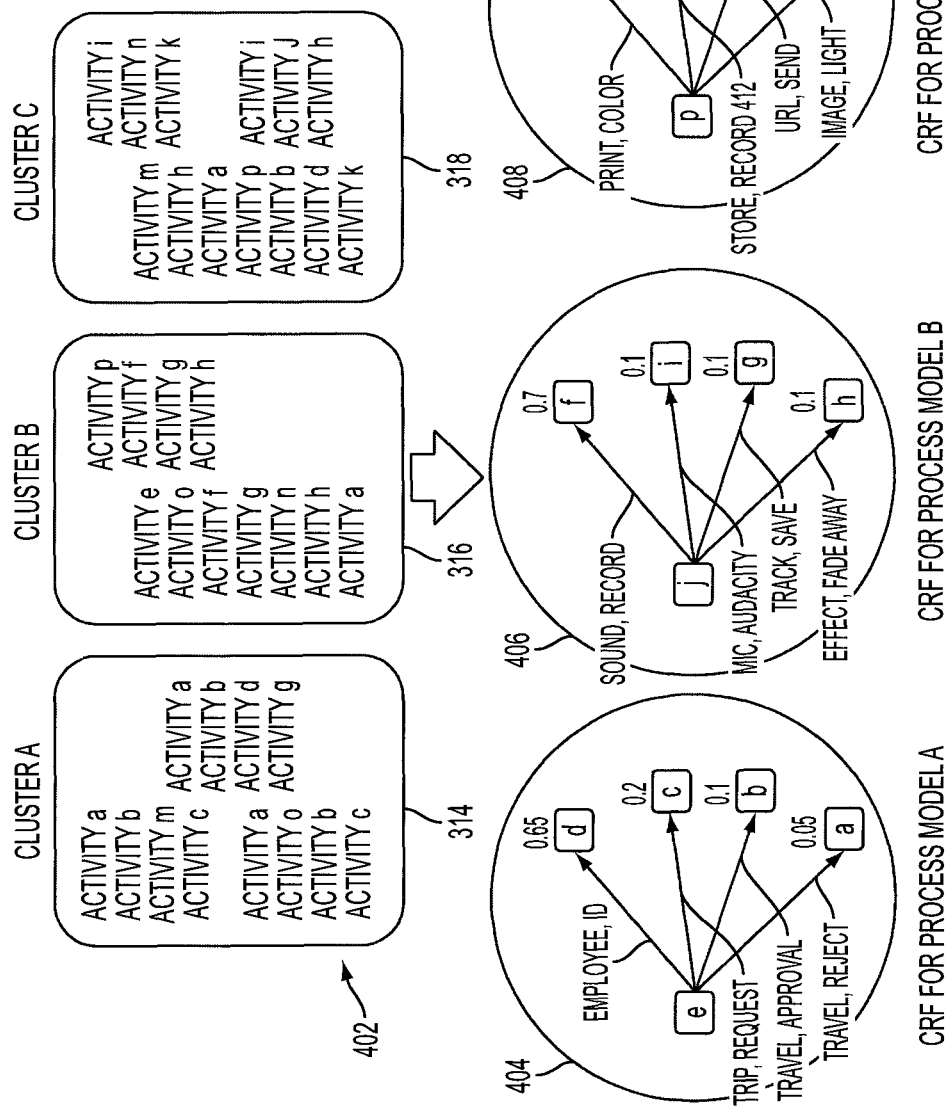
FIG. 4 is a schematic illustration of training a CRF for a process model.

With regard to the training of a CRF per process model, the aim is to learn a probabilistic model per cluster using substantially all the traces (or documents) contained in that cluster as the training data. As shown in FIG. 4, which illustrates training a CRF for a process model, the CRF will "learn" to classify the sequences of activities that constitute a process model. In this regard, the CRF associates each activity entry in a trace to an activity label according to its features (e.g., words) and the previous activity.

The input 402 of the CRF training includes, for example, K clusters of traces/documents (e.g., Cluster A, Cluster B, Cluster C, etc.) as computed in the previous step. In order to obtain one or more CRFs (e.g., 404, 406, 408) modeling the transitions between activities for each specific process model, i.e., a CRF (404) for process model A, a CRF (406) for process model B, a CRF (408) for process model C, and so on, the following training procedure is applied. As a first step of the training procedure, a TF-IDF vector is associated for each cluster (e.g., 314, 316, and 318) and for each entry in a trace in the following manner. First, a label, e.g., an activity name, for each activity log entry is assigned according to a reference annotation. Second, the features of the vector are words occurring in the entry. Third, for each feature, a TF-IDF score is computed by taking into account substantially all the activity log entries in this cluster only. A Boolean feature is added, such as the name of the previous activity.

As a second step of the training procedure, the feature matrices are computed (or generated). They are term-document matrices where generally each document is a trace activity entry, and they are augmented with Boolean features that represent the previous activity.

Note that there are at least three differences between the TF-IDF matrices computed in the first step and in the second step.

For example, in the first step, a TF-IDF matrix that is common to most, if not all, traces/documents was computed, whereas in the second step, a TF-IDF matrix for generally each cluster of traces/documents, i.e., the TF-IDF matrices that are local to a cluster, was computed. In the first step, the complete traces were considered as documents in the TF-IDF matrix, whereas in the second step, generally each activity entry in a trace is considered as a document in the TF-IDF matrices.

Figure 5:
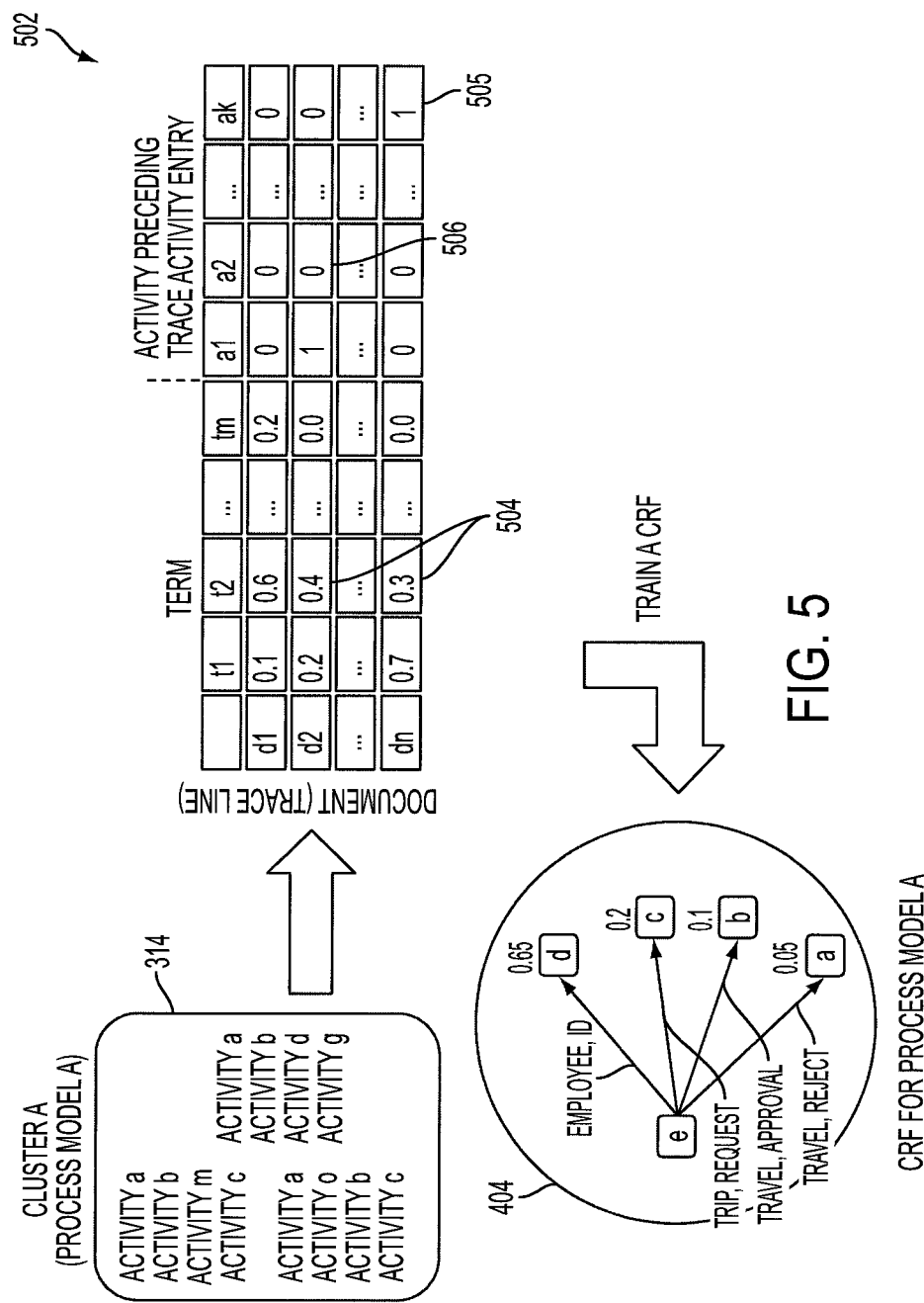
FIG. 5 is a schematic illustration of an augmented TF-IDF feature matrix for training a CRF for a process model.

On the other hand, in the second step, TF-IDF matrices augmented with Boolean features representing the previous activity are computed. In this regard, FIG. 5 shows an augmented TF-IDF feature matrix 502, where d1, d2, . . . dn are documents/trace activity entries, t1, t2, . . . tm are terms, a1, a2, . . . ak are activities preceding the current activity entry in the trace, and generally each cell 504 contains at least the TF-IDF score of a given term in a given document. If an activity entry is preceded in the trace by a given activity, the feature corresponding to this activity is set to 1 (505), otherwise it is set to 0 (506).

As a last step of the training procedure, a CRF is trained given each feature matrix. As shown in FIG. 4, the output of the training procedure is K CRFs (e.g., 404, 406, and 408), generally each of which models the transition probabilities between activities of one process model. Additionally, K IDF vectors of terms are kept. They will be used during the online classification. Each vector is of size $V_c$, which is the size of the feature vocabulary for a cluster c.

Thus, by way of example, given a set of features in a trace entry 412 (e.g., store, record) add that the previous identified activity is "p". The CRF 408 assigns a probability (e.g., 0.35) that the next activity is "n".

The online system usage step 203 will now be described in greater detail. Once the system has been trained by learning the CRFs that model the different process models, it can be used online for classifying new incoming process traces.

Figure 6:
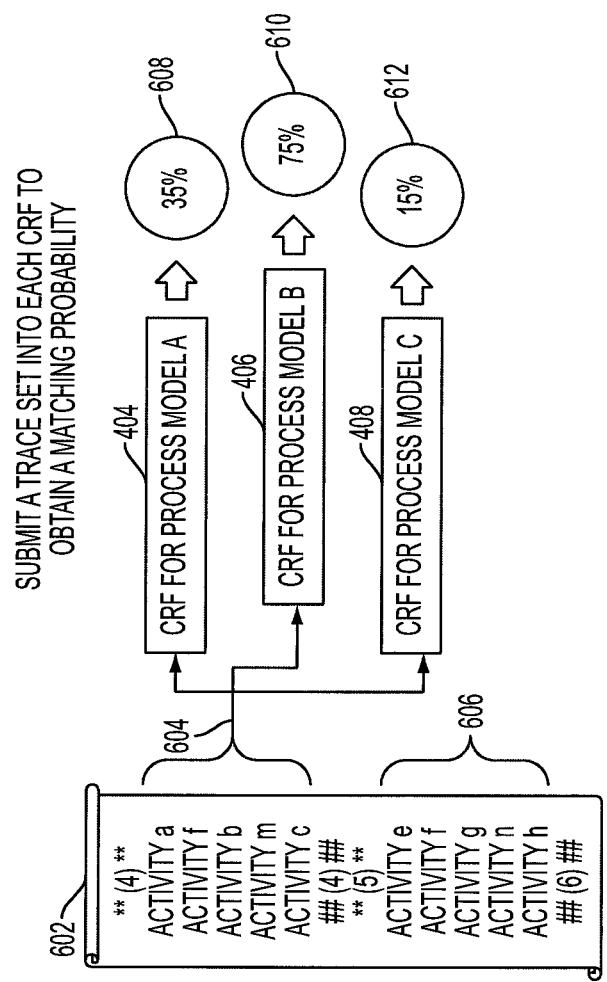
FIG. 6 is a schematic illustration of decoding traces.
Figure 7:
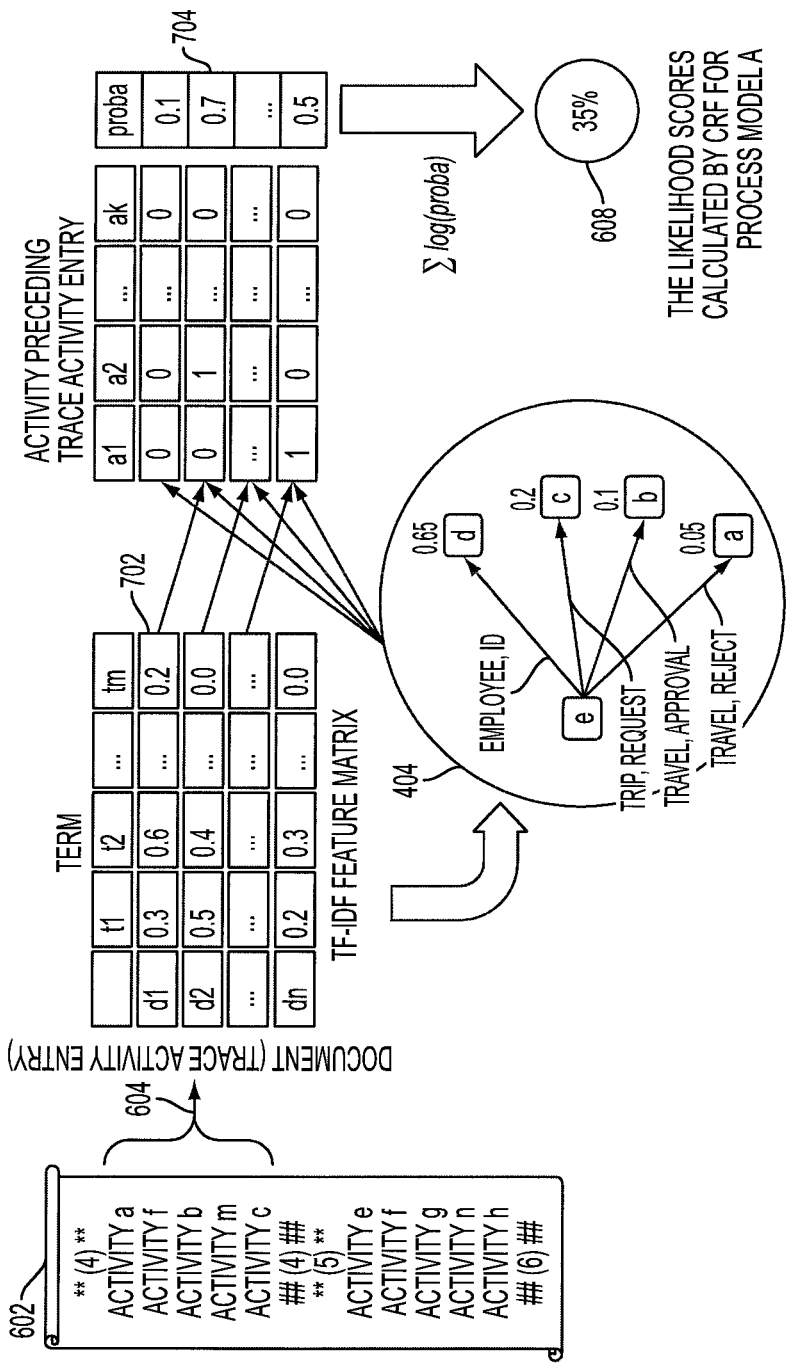
FIG. 7 is a schematic illustration showing the decoding of traces of FIG. 6 in greater detail.

With reference now to FIGS. 6 and 7 (decoding traces), as input, new incoming noisy and unlabeled traces are generated by at least one unknown process. The next step is to submit a trace set 604, 606 into the CRFs (e.g., 404, 406, 408) to obtain, for example, a matching probability (e.g., 608, 610, 612) and a decoding of the trace (i.e., labeling of activity entries).

For each CRF (e.g., the CRF for process model A, and so on), each activity entry 702 of the incoming trace 604 may be transformed into a feature vector substantially identical to the one used for training the CRF, as described above. The TF-IDF scores are computed using the IDF vector previously kept for the current CRF.

The CRF (in this example, the CRF for process model A) classifies the sequence of feature vectors that correspond to the sequence of activities in the incoming trace. The CRF 404 labels each activity log entry with an activity name and assigns a particular likelihood 704 to this sequence of activities according to its learned model.

The likelihood scores 608 calculated by each CRF are ranked. The highest likelihood reflects the right classification for the trace. This means that this trace has been generated by the process model associated with the CRF that computed this highest likelihood score.

The output includes the process model that generated the trace in addition to the activity names corresponding to each activity entry in the trace.

Figure 8:
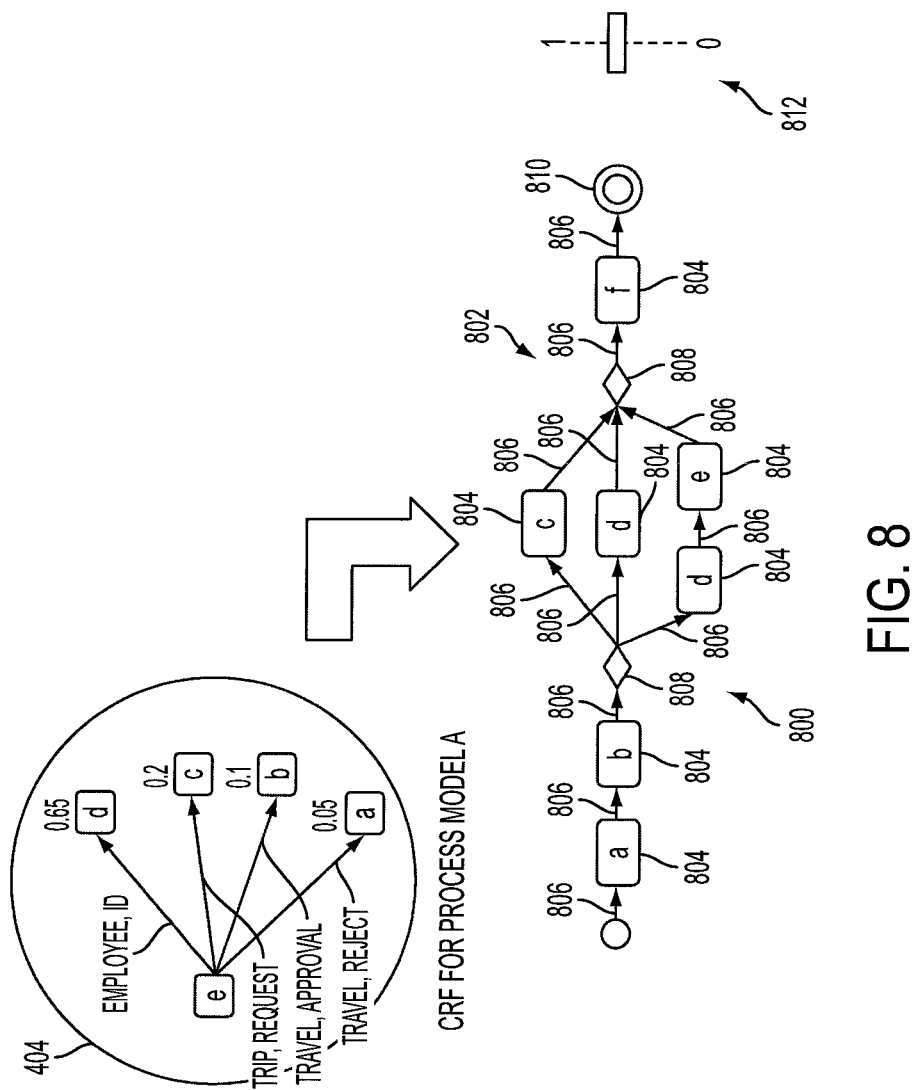
FIG. 8 is a schematic illustration of a visual representation for the discovered process models associated with the learned CRFs.

The next step provides a visual representation for the discovered process models associated with the learned CRFs. An example is shown in FIG. 8. The visual representation 800 is suitably a tunable process graph 802 in which multiple nodes 804 (e.g., a, b, c, d, e, f, etc.) represent activities and multiple arrows 806 represent transitions, for example. The visual representation 800 also includes one or more "OR" or "AND" gateways 808 and an output 810. A tuning parameter 812 can be changed to make more or less activities and transitions appear. The tunable process graph 802 may be tuned using, for example, a [0,1] parameter that controls the level of transition rates: (a) when it is close to 1, only highly probable transitions are shown to the user, and (b) when it is close to 0, transitions with low probabilities are visible.

Optionally, colors may be associated with the arrows 806 and the activities 804 according to their transition probabilities. In this case, the arrows 806 may be colored with N nuances of a color according to the interval of transition probabilities to which they belong, i.e., the higher the probability, the darker the color. For example, if an activity turns out to be noise, it may be colored in red as well as all its incoming and outgoing transitions.

Figure 9:
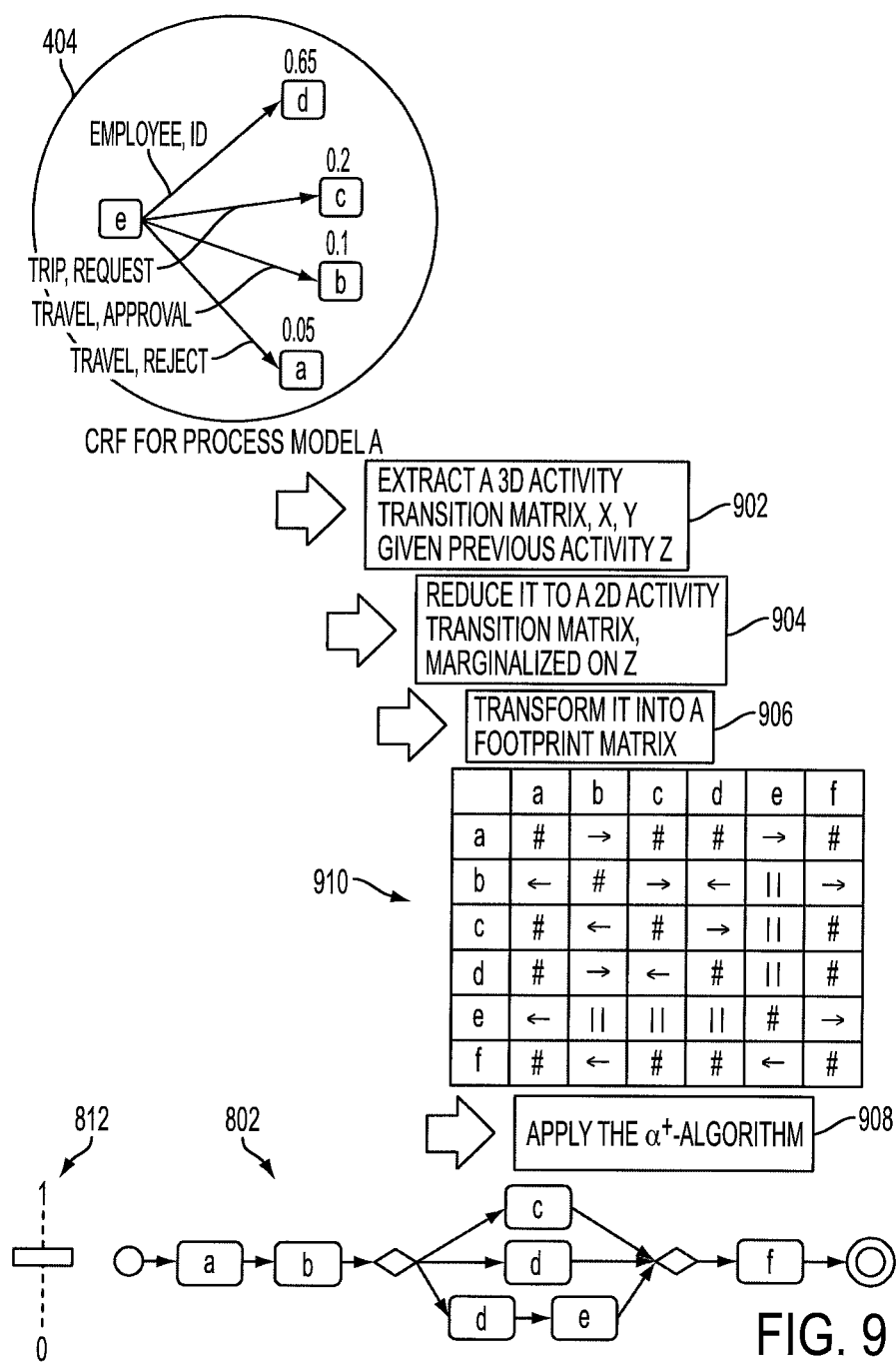
FIG. 9 is a schematic illustration showing the steps to construct the visual representation of FIG. 8 in greater detail.

With reference now to FIG. 9, the input includes K learned CRF models (e.g., the CRF for process model A).

From a CRF model, a 3D activity transition matrix is extracted that models transition probabilities from an activity X to an activity Y given the previous activity Z (902).

The 3D activity transition matrix is reduced to a 2D transition matrix by marginalizing it on Z, i.e., summing up all the probabilities from an activity X to an activity Y or Z (904).

The probability matrix is transformed into a footprint matrix 910 as defined by the α+-algorithm (906) as follows. H and L are, respectively, high and low transition probabilities thresholds that can be given by the user, e.g., H=0.55, L=0.2. For example:
If $P(a,b) \geq H$, and $P(b,a) \leq L \rightarrow a>b$ (denotes that a precedes b)
If $P(a,b) \leq L$, and $P(b,a) \geq H \rightarrow a<b$ (denotes that b precedes a)
If $P(a,b) \geq H$, and $P(b,a) \geq H \rightarrow a\|b$ (denotes that a and b are parallel)
If $P(a,b) \leq L$, and $P(b,a) \leq L \rightarrow a\#b$ (denotes that a and b never rarely transition from one to the other)

The α+-algorithm is applied (908) to construct from the footprint matrix 910 a tunable process graph (e.g., the tunable process graph 802 of FIG. 8).

The output includes K process graphs that are tunable with the tuning parameter (812) using the transition probabilities kept in the 2D transition matrices.

Figure 10:
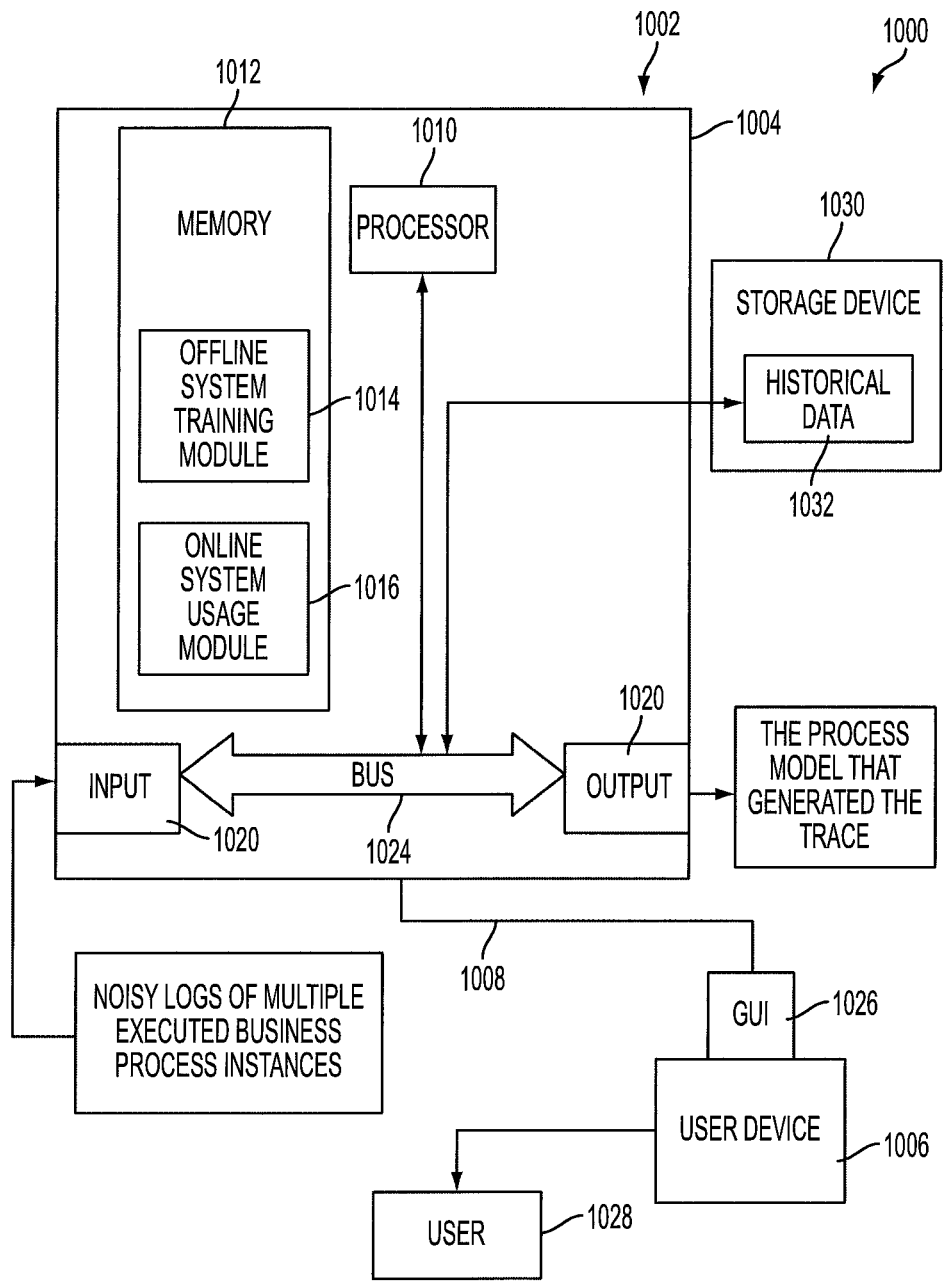
FIG. 10 is a schematic illustration of a process discovery system in one aspect of the exemplary embodiment.

FIG. 10 is a functional block diagram of an exemplary system 1000 configured to cluster, model, and/or visualize process models from noisy logs using non-negative matrix factorization and classification of activity sequences. The system 1000 includes a process discovery device 1002, hosted by a computing device 1004, such as a server computer at a service provider site, and/or a user device 1006, hosted by a computing device, at a customer site, such as a server, which can be linked together by communication links 1008, referred to herein as a network. These components are described in greater detail below.

The process discovery device 1002 illustrated in FIG. 10 includes a processor 1010, which controls the overall operation of the process discovery device 1002 by execution of processing instructions, which are stored in memory 1012 connected to the processor 1010.

The processes that are disclosed herein are performed by the processor 1010 according to the instructions stored in the memory 1012. In particular, the memory 1012 stores, among other things, an offline system training module 1014 and an online system usage module 1016.

The illustrated offline system training module 1014 is configured to cluster similar log traces using a process such as Non-negative Matrix Factorization (NMF) with each cluster representing a process model and to learn a Conditional Random Field (CRF) model for each process model, as described above.

The online system usage module 1016 is configured to decode new incoming log traces and construct at least one tunable process graph in which transitions are shown or hidden according to a tuning parameter, as described above.

The process discovery device 1002 also includes one or more communication interfaces (I/O), such as network interfaces 1020 for communicating with external devices, such as the user device 1006. The various hardware components 1010, 1012, and 1020 of the process discovery device 1002 may all be connected by a bus 1024.

With continued reference to FIG. 10, the process discovery device 1002 is communicatively linked to a user interface device (GUI) 1026 via a wired and/or wireless link. In various embodiments, the user interface device 1026 may include one or more of a display device, for displaying information to users, such a visual representation for the discovered process models associated with the learned CRFs to an operator 1028 for review, and a user input device, such as a keyboard or touch or writable screen, for inputting instructions, and/or a cursor control device, such as a mouse, trackball, or the like, for communicating user input information and command selections to the processor 1010. Specifically, the user interface device 1026 includes at least one of an input device and an output device, both of which include hardware, and which are communicatively linked with the server 104 via wired and/or wireless link(s).

With continued reference to FIG. 10, the system 1000 may further include a storage device 1030 storing historical data 1032, and which is part of, or in communication with, the process discovery device 1002. In one embodiment, the process discovery device 1002 can be in communication with a server (not shown) that hosts the storage device 1030 for storing historical data 1032.

The memory 1012 may represent any type of tangible computer readable medium such as random access memory (RAM), read only memory (ROM), magnetic disk or tape, optical disk, flash memory, or holographic memory. In one embodiment, the memory 1012 may each comprise a combination of random access memory and read only memory. The digital processor 1010 can be variously embodied, such as by a single-core processor, a dual-core processor (or more generally by a multiple-core processor), a digital processor and cooperating math coprocessor, a digital controller, or the like. The digital processor 1010, in addition to controlling the operation of the respective process discovery device 1002, executes instructions stored in memory 1012 for performing the parts of the method outlined below.

The software modules as used herein, are intended to encompass any collection or set of instructions executable by the process discovery device 1002 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 1020 may include, for example, a modem, a router, a cable, and and/or Ethernet port, etc.

As will be appreciated, while two computing devices 1004, 1006 are illustrated by way of example, the system 1000 may be hosted by fewer or more linked computing devices. Each computing device may include, for example, a server computer, desktop, laptop, or tablet computer, smartphone or any other computing device capable of implementing the method described herein.

Just some of the benefits of the exemplary embodiment include that: (a) it addresses noise, (b) it is built on the top of state-of-the-art robust clustering and probabilistic models, (c) once the system has learned the models during the offline step, there is no need to store any new (i.e., huge amounts of) incoming logs during the online step.

Although the exemplary method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated recommender system, wherein the disclosure is not limited to the specific applications and embodiments illustrated and described herein.

The exemplary method may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented process discovery method comprising:
   receiving as input at least one noisy log file that contains a plurality of labeled log traces from a plurality of process models;
   clustering similar log traces using non-negative matrix factorization (NMF) into a plurality of clusters, wherein each cluster represents a different process model;
   learning one or more Conditional Random Field (CRF) models for each of the process models;
   decoding new incoming log traces; and
   constructing a tunable process graph, wherein one or more transitions are shown or hidden according to a tuning parameter, wherein clustering similar log traces further comprises decomposing a term-document matrix into at least a term-cluster matrix and a cluster-document matrix.

2. The computer-implemented process discovery method of claim 1, wherein the CRF learns to classify a sequence of activities that comprise a process model by associating an activity entry in a log trace to an activity label at least according to one or more features and a previous activity.

3. The computer-implemented process discovery method of claim 1, wherein learning a CRF model for each of the process models further comprises:
   associating a TF-IDF vector for at least one cluster and for the entries in a log trace by assigning a label to each activity log entry according to a reference annotation, wherein one or more features of the vector comprise one or more words occurring in the entry, and for one or more features computing a TF-IDF score by taking into account substantially all the activity log entries in the cluster only, and adding a Boolean feature such as the name of the previous activity;
generating one or more feature matrices; and
training a CRF for each feature matrix.

4. The computer-implemented process discovery method of claim 1, further comprising providing a visualization of discovered process models by transforming a probabilistic activity transition matrix into a footprint matrix directly usable by a α+-algorithm.

5. The computer-implemented process discovery method of claim 1, wherein the tunable process graph comprises a visual representation of discovered process models associated with the learned CRFs and includes at least a plurality of nodes representing activities, a plurality of arrows representing transitions, and one or more "OR" or "AND" gateways.

6. The computer-implemented process discovery method of claim 1, wherein decoding new incoming log traces further comprises:
submitting the incoming log traces into the learned CRFs to obtain a matching probability and a decoding of the incoming log traces, wherein the incoming log traces include activity log entries;
the CRFs classifying a sequence of feature vectors that correspond to a sequence of activities in the incoming traces;
the CRFs labeling each activity log entry with an activity name and assigning a particular likelihood score to each of the sequences of activities according to the learned models;
ranking likelihood scores calculated by each CRF;
generating as output the process model that generated the trace and the activity names corresponding to each activity entry in the trace.

7. The computer-implemented process discovery method of claim 1, wherein the tunable process graph is tuned using a [0,1] parameter that controls the level of transition rates, wherein when the parameter is 1, highly probable transitions are shown to the user and when the parameter is 0, transitions with low probabilities are visible.

8. A process discovery system comprising:
a processor; and
a memory storing instructions that, when executed, cause the system to:
receive as input at least one noisy log file that contains a plurality of labeled log traces from a plurality of process models, cluster similar log traces using Non-negative Matrix Factorization (NMF) with each cluster representing a different process model, and learn a Conditional Random Field (CRF) model for each process model;
decode new incoming log traces and to construct a tunable process graph in which transitions are shown or hidden according to a tuning parameter;
provide a visualization of discovered process models by transforming a probabilistic activity transition matrix into a footprint matrix directly usable by a α+-algorithm.

9. The process discovery system of claim 8, wherein the memory stores instructions that, when executed, cause the system to cluster similar log traces by decomposing a term-document matrix into at least a term-cluster matrix and a cluster-document matrix.

10. The process discovery system of claim 8, wherein the CRF learns to classify a sequence of activities that comprise a process model by associating an activity entry in a log trace to an activity label at least according to one or more features and a previous activity.

11. The process discovery system of claim 8, wherein the memory stores instructions that, when executed, cause the system to:
asssociate a TF-IDF vector for at least one cluster and for the entries in a log trace by assigning a label to each activity log entry according to a reference annotation, wherein one or more features of the vector comprise one or more words occurring in the entry, and for each feature computing a TF-IDF score by taking into account the activity log entries in the cluster only, and adding a Boolean feature such as the name of the previous activity;
generate one or more feature matrices; and
train a CRF for each feature matrix.

12. The process discovery system of claim 8 wherein the tunable process graph comprises a visual representation of discovered process models associated with the learned CRFs and includes at least a plurality of nodes representing activities, a plurality of arrows representing transitions, and one or more "OR" or "AND" gateways.

13. The process discovery system of claim 8, wherein the memory stores instructions that, when executed, cause the system to decode new incoming log traces by:
submitting the incoming log traces into the learned CRFs to obtain a matching probability and a decoding of the incoming log traces, wherein the incoming log traces include activity log entries;
the CRFs classifying a sequence of feature vectors that correspond to a sequence of activities in the incoming traces;
the CRFs labeling each activity log entry with an activity name and assigning a particular likelihood score to each of the sequences of activities according to the learned models;
ranking likelihood scores calculated by each CRF;
generating as output the process model that generated the trace and the activity names corresponding to each activity entry in the trace.

14. The process discovery system of claim 8, wherein the tunable process graph is tuned using a [0,1] parameter that controls the level of transition rates, wherein when the parameter is 1, highly probable transitions are shown to the user and when the parameter is 0, transitions with low probabilities are visible.

15. A computer-implemented process discovery method comprising:
receiving as input at least one noisy log file that contains a plurality of labeled trace activity log entries from a plurality of process models, wherein each trace in the log comprises a document;
calculating a term frequency-inverse document frequency (TF-IDF) vector score for each document in the log file, wherein words appearing in the document comprise the features of a vector for which the TF-IDF vector score is calculated;
obtaining a term-document matrix, wherein each cell contains the TF-IDF score of a given term in a given document;
applying non-negative matrix factorization (NMF) to cluster similar documents;
obtaining a plurality of clusters of noisy process documents via NMF, wherein each cluster contains the documents of different instances of the same process model;
for each cluster and for each activity log entry in a document, associating a TF-IDF vector is performed as follows:

a label for each activity log entry is assigned according to a reference annotation;
the features of the vector are words occurring in the entry;
for each feature, a TF-IDF score is computed by taking into account all the entries in this cluster only;
a Boolean feature comprising the name of the previous activity is added;
computing feature matrices, wherein the feature matrices comprise term-document matrices in which each document is a trace activity entry and is augmented with at least one Boolean feature that represents the previous activity;
training a conditional random field (CRF);
obtaining as output a plurality of CRFs, wherein each CRF is configured to model one or more transition probabilities between activities of one process model;
storing a plurality of inverse document frequency (IDF) vectors of terms, wherein each vector is the size of a feature vocabulary for a given cluster.

16. The computer-implemented process discovery method of claim 15, further comprising:
receiving as input at least one noisy log file including a plurality of labeled trace activity log entries generated by an unknown process;
for each CRF transforming each activity entry of the incoming trace into a feature vector identical to the vector used for training the CRF;
classifying the sequence of feature vectors that correspond to the sequence of activities in the incoming trace and labeling each activity entry with an activity name and assigning a particular likelihood to this sequence of activities according to its learned model;
ranking the likelihood scores calculated by each CRF, wherein the highest likelihood reflects the right classification for the trace;
obtaining as output the process model that generated the trace.

17. The computer-implemented process discovery method of claim 16, further comprising:
receiving as input the learned CRF models;
extracting from at least one CRF model, a three dimensional (3D) activity transition matrix that models transition probabilities from a first activity X to a second activity Y given a previous activity Z;
reducing the 3D activity transition matrix to a two dimensional (2D) transition matrix by marginalizing it on Z;
transforming the probability matrix into a footprint matrix as defined by an α+-algorithm as follows:
If $P(a,b) \geq H$, and $P(b,a) \leq L \rightarrow a > b$ (denotes that a precedes b)
If $P(a,b) \leq L$, and $P(b,a) \geq H \rightarrow a < b$ (denotes that b precedes a)
If $P(a,b) \geq H$, and $P(b,a) \geq H \rightarrow a \| b$ (denotes that a and b are parallel)
If $P(a,b) \leq L$, and $P(b,a) \leq L \rightarrow a \# b$ (denotes that a and b never rarely transition from one to the other)
where H and L are respectively high and low transition probabilities thresholds that can be given by the user;
applying the α+-algorithm to construct from this matrix a process graph;
receiving as output a process graph that is tunable with a tuning parameter using the transition probabilities kept in the 2D transition matrices.

18. A computer-implemented process discovery method, comprising:
receiving as input at least one noisy log file that contains a plurality of labeled log traces from a plurality of process models;
clustering similar log traces using non-negative matrix factorization (NMF) into a plurality of clusters, wherein each cluster represents a different process model;
learning a Conditional Random Field (CRF) model for each of the process models;
decoding new incoming log traces;
constructing a tunable process graph, wherein one or more transitions are shown or hidden according to a tuning parameter; and
providing a visualization of discovered process models by transforming a probabilistic activity transition matrix into a footprint matrix directly usable by a α+-algorithm.

19. The computer-implemented process discovery method of claim 18, wherein the CRF learns to classify a sequence of activities that comprise a process model by associating an activity entry in a log trace to an activity label at least according to one or more features and a previous activity.

20. The computer-implemented process discovery method of claim 18, wherein learning a CRF model for each of the process models further comprises:
associating a TF-IDF vector for at least one cluster and for the entries in a log trace by assigning a label to each activity log entry according to a reference annotation, wherein one or more features of the vector comprise one or more words occurring in the entry, and for each feature computing a TF-IDF score by taking into account the activity log entries in the cluster only, and adding a Boolean feature such as the name of the previous activity;
generating one or more feature matrices; and
training a CRF for each feature matrix.

21. The computer-implemented process discovery method of claim 18, wherein the tunable process graph comprises a visual representation of discovered process models associated with the learned CRFs and includes at least a plurality of nodes representing activities, a plurality of arrows representing transitions, and one or more "OR" or "AND" gateways.

22. The computer-implemented process discovery method of claim 18, wherein decoding new incoming log traces further comprises:
submitting the incoming log traces into the learned CRFs to obtain a matching probability and a decoding of the incoming log traces, wherein the incoming log traces include activity log entries;
the CRFs classifying a sequence of feature vectors that correspond to a sequence of activities in the incoming traces;
the CRFs labeling each activity log entry with an activity name and assigning a particular likelihood score to each of the sequences of activities according to the learned models;
ranking likelihood scores calculated by each CRF;
generating as output the process model that generated the trace and the activity names corresponding to each activity entry in the trace.

23. The computer-implemented process discovery method of claim 18, wherein the tunable process graph is tuned using a [0,1] parameter that controls the level of transition rates, wherein when the parameter is 1, highly probable transitions are shown to the user and when the parameter is 0, transitions with low probabilities are visible.

* * * * *